United States Patent
Irie (10) Patent No.: US 6,830,366 B2
(45) Date of Patent: Dec. 14, 2004

(54) DELINEATOR LIGHTING APPARATUS (75) Inventor: Shinichi Irie, Hachioji (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/406,989

(22) Filed: Apr. 3, 2003

(65) Prior Publication Data
US 2003/0214804 A1 Nov. 20, 2003

(30) Foreign Application Priority Data
Apr. 5, 2002 (JP) ........................ 2002-104124

(51) Int. Cl.[7] .................. F21S 4/00; F21V 21/005
(52) U.S. Cl. .................... 362/583; 362/152; 362/293; 362/552
(58) Field of Search ............ 362/23, 26, 551, 362/552, 554, 556, 583, 152, 293

(56) References Cited

U.S. PATENT DOCUMENTS

| 4,422,719 A |   | 12/1983 | Orcutt |
|---|---|---|---|
| 5,043,850 A |   | 8/1991 | Dreyer, Jr. |
| 5,222,795 A | * | 6/1993 | Hed .................... 362/558 |
| 5,258,896 A |   | 11/1993 | Dreyer, Jr. |
| 5,288,259 A | * | 2/1994 | Konta et al. ............ 446/219 |
| 5,497,294 A |   | 3/1996 | Dreyer, Jr. |
| 5,664,041 A | * | 9/1997 | Szum ................... 385/128 |
| 6,217,188 B1 | * | 4/2001 | Wainwright et al. ....... 362/103 |
| 6,301,418 B1 | * | 10/2001 | Freier et al. ............. 385/123 |

FOREIGN PATENT DOCUMENTS

| JP | 06-073715 |   | 3/1994 |   |
|---|---|---|---|---|
| JP | 6118238 A |   | 4/1994 |   |
| JP | 6118239 A |   | 4/1994 |   |
| JP | 6118240 A |   | 4/1994 |   |
| JP | 6118243 A |   | 4/1994 |   |
| JP | 6118244 A |   | 4/1994 |   |
| JP | 8246427 | * | 8/1996 | ........... E01F/15/02 |
| JP | 8246427 |   | 9/1996 |   |
| JP | 10142428 |   | 5/1998 |   |
| JP | 10148725 |   | 6/1998 |   |
| JP | 10307165 | * | 10/1998 | ............. F21S/2/00 |
| WO | WO 96/29538 |   | 9/1996 |   |
| WO | WO 98/08024 |   | 2/1998 |   |

* cited by examiner

Primary Examiner—Alan Cariaso
Assistant Examiner—Mark Tsidulko
(74) Attorney, Agent, or Firm—Stephen W. Buckingham (57) ABSTRACT

A lighting apparatus includes at least two light-emitting elements, the light-emitting elements having at least two light-emitting zones which are disposed in a regular pattern throughout the entire length and allow light to be emitted in different light-emission intensities, each of the light-emitting elements allowing light to be emitted in continuous sequence from the light-emitting zones in one direction, wherein adjacent light-emitting elements are positioned with a predetermined distance deviation.

13 Claims, 3 Drawing Sheets

DELINEATOR LIGHTING APPARATUS

CROSS-REFERENCE TO RELATED APPLICATION(S)

This application claims priority from Japanese application number 2002-104124, filed Apr. 5, 2002, for "Delineator Lighting Apparatus."

BACKGROUND OF THE INVENTION

The present invention relates to a delineator lighting apparatus, and more particularly to a delineator lighting apparatus using a plurality of side face emitting type optical fibers in combination.

As is well known, discharge tubes such as fluorescent lights are widely used as linear basic lights and/or decorative lights at easily-accessible locations. However, since such discharge tubes are easily broken and may cause burns or other injury or damage by heating, electrical leaks, and electric shocks, for example, some have used side face emitting type optical fibers which do not cause such dangers. Since a side face emitting type optical fiber is capable of seamless linear emission and the replacement of the bulb of its light source is easy because the light source may be positioned where it can be easily maintained, it has recently come into use as a delineator lighting fixture in dangerous places such as curves in roads and in passages in buildings, for example, or as an attention-attracting light at platforms and pedestrian crossings, for example.

Figure 1:
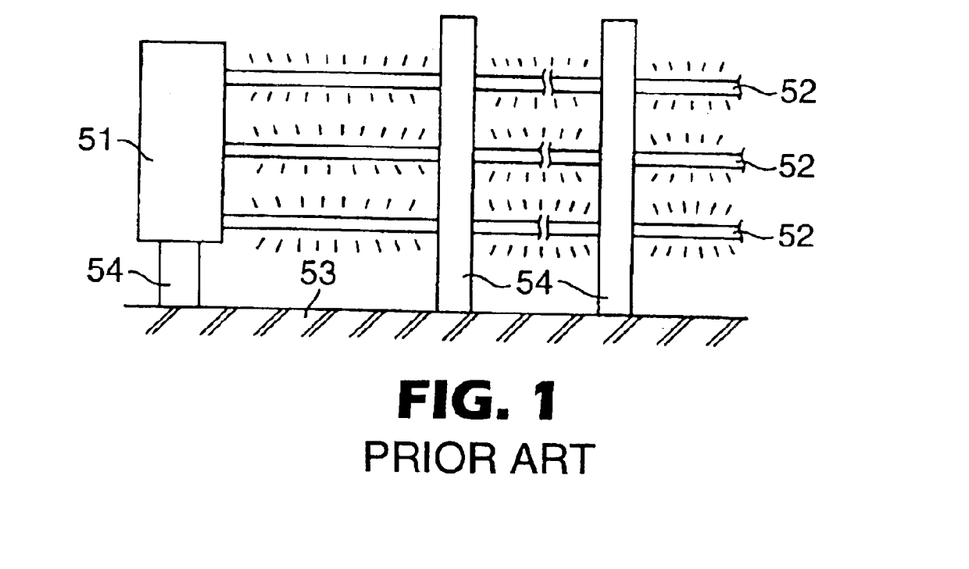
FIG. 1 is a front view of a prior art light fence using light diffusing tubes.

In the Japanese Unexamined Patent Publication (Kokai) No.6-73715, a light fence as shown in FIG. 1 is disclosed. This light fence comprises a light source 51 and light-emitting means 52 connected to the light source 51. The light-emitting means 52 are light diffusing tubes comprising a core formed with liquid-type transparent material and a clad capable of bending. The light-emitting means 52 are mounted on the poles 54 erected on a road 53. Since the light-emitting means 52 emit or flash light in a line form, they may inform automobile drivers of the existence of a dangerous zone in advance. However, since this light fence only emits or flashes light in a line form, it has little variation in light emission; thus, drivers may not be alerted to of the existence of a dangerous zone.

Figure 2:
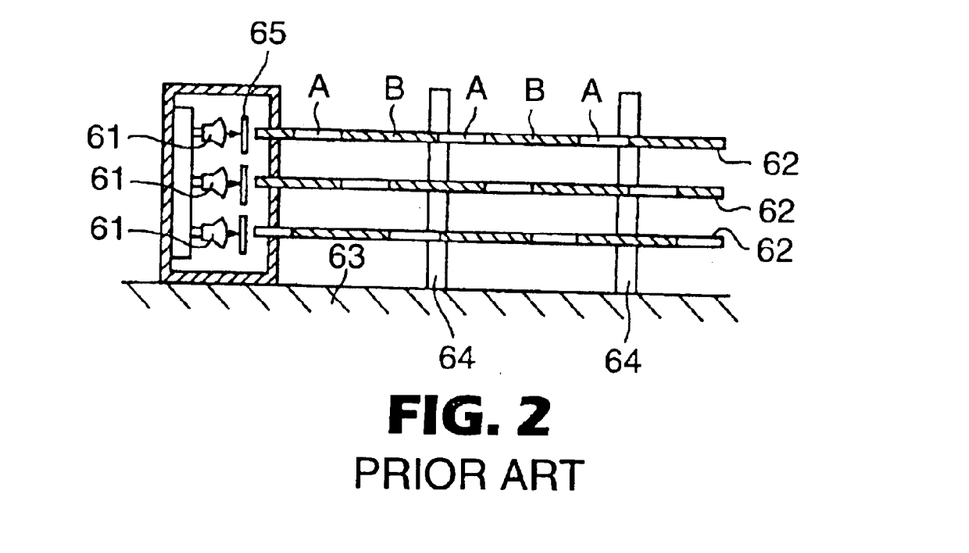
FIG. 2 is a front view of a prior art delineator light using light-emitting elements.

Furthermore, in the Japanese Unexamined Patent Publication (Kokai) No.8-246427, a delineator lighting apparatus as shown in FIG. 2 is disclosed. The delineator lighting apparatus comprises light sources 61, and tube-shaped light-emitting elements 62 in which a light leakage section A and a light shielding section B in a proper length are formed repeatedly in the longitudinal direction along the outer surface, and in which the light incident from the light source 61 through the color filter 65 is emitted from the light leakage section A, thus emitting light in a broken line form. The light-emitting elements 62 are mounted on the poles 64 erected on a road 63. Since the light-emitting elements 62 so emit light that the light emission shifts from a light emitting zone to another light emitting zone in a broken line form, the delineator lighting apparatus may indicate the line shape of the road intelligibly. However, because only light emission in a broken line form is obtained by this delineator lighting apparatus, there is a problem that the line shape of a road is not able to be indicated without a break.

BRIEF SUMMARY OF THE INVENTION

It is an object of the present invention to solve the above prior art problems. Accordingly, one object of the present invention is to provide a delineator lighting apparatus which emits light without a break over a long distance; for example, when it is used as a light fence, delineator lighting apparatus, or the like on a road.

In one aspect, the present invention is a delineator lighting apparatus for guiding a person's line of sight by the shift of light emission from one light-emitting zone to another light-emitting zone, said delineator lighting apparatus comprising at least two light-emitting elements being extended in the longitudinal direction, said light-emitting elements having the same or different compositions and comprising at least two light-emitting zones which are disposed in a regular pattern throughout the entire length and allow light to be emitted in different light-emission intensities, each of said light-emitting elements allowing light to be emitted in continuous sequence from said light-emitting zones in one direction, said adjacent light-emitting elements being disposed with a predetermined distance deviation and allowing light to be emitted regularly one after another with a time difference.

According to a preferred embodiment, the delineator lighting apparatus of the present invention uses side face emitting type optical fibers as light-emitting elements. The plurality of side face emitting type optical fibers are disposed substantially in parallel, and each of the optical fibers is so composed that a light attenuation section or colored section (semi-emitting zone) formed by covering the outer surface with a semitransparent or colored material in a proper length in the longitudinal direction, and a non-light attenuation and non-colored section (main-emitting zone) are repeated. The main-emitting zones of each of the optical fibers are disposed and deviated from each other in the longitudinal direction. The light incident from the light source to each of the optical fibers (incident light) is blocked, attenuated, or colored only during any given time by the semi-emitting zone. Additionally, the semi-emitting times for the optical fibers are deviated from each other. Further, the sequence of semi-emitting of each of the optical fibers is not limited. The main-emitting zone of the optical fiber allows the brightest light to be emitted when the light incident from the light source is not blocked, attenuated and colored; that is, when the incident light is emitted as it is from the main-emitting zone. By changing the emitting state of the incident light from the semi-emitting state to the main-emitting state sequentially in each of the optical fibers, a brightest light emitting zone is shown as it moves sequentially in the longitudinal direction, and thereby the "delineator effect" of the present invention may be realized. Furthermore, by assigning any one of the optical fibers to the emitting state at all times, at least one of the emitting state optical fibers is always visible. For this reason, a directional movement of light without a break is continually provided over a long distance.

Further, the present invention provides a traffic sign system comprising the delineator lighting apparatus of the present invention. Furthermore, the present invention provides a decorative system comprising the delineator lighting apparatus of the present invention.

BRIEF DESCRIPTION OF THE DRAWINGS

The drawings are presented for purposes of illustration only and are not to scale.

DETAILED DESCRIPTION

The present invention is a lighting apparatus used for guiding a person's line of sight by the shift of light emission from one light-emitting zone to another light-emitting zone, and comprises at least a light source and light-emitting elements allowing light to be emitted by receiving the light from the light source and leading the light inside.

Usually, one light source is used for each of the light-emitting elements. If required, one light source may be commonly used for the plurality of light-emitting elements. The light sources are preferably so disposed that the light-emitting elements have a light source at the same end. The light sources are usually disposed so as to make contact with the end faces of the light-emitting elements.

In a delineator lighting apparatus of the present invention, the light source to be used is not restricted, and a suitable one may be selected and used according to the installation place and/or the desired emitting effect of the lighting apparatus. Suitable light sources to produce light include, but are not limited to, a metal halide lamp, xenon lamp, halogen lamp, light-emitting diode, fluorescent light, or the like.

At least two, preferably three or more light-emitting elements are used. These light-emitting elements are usually disposed substantially in parallel with a vertical distance between them. But, when special or exceptional emitting effect is desired, the light-emitting elements may be disposed in a different manner, and all or part of the light-emitting elements may be disposed in any configurations or patterns including parallel patterns.

Furthermore, light-emitting elements extending in the longitudinal direction are usually used. Suitable forms for light-emitting elements include, but are not limited to, tubes, thin plates, thin grooves, or the like. By changing the form of the light-emitting element, the most suitable effect may be obtained according to the installation place of the lighting apparatus.

The plurality of light-emitting elements may have the same compositions, forms, and/or dimensions, or different compositions, forms, and/or dimensions. Any combination of compositions, forms, and dimensions of the light-emitting elements used for the lighting apparatus may be chosen to result in the most suitable emission effect for the installation place and purpose of the particular lighting apparatus.

In one embodiment, each of the light-emitting elements comprises at least two sets of light-emitting zones allowing different light-emission intensities, and the light-emitting zones are disposed in a regular pattern over the entire length of the light-emitting element. That is, in case that the light-emitting zones include, for example, two kinds of zones of A zones and B zones, A zones and B zones may be disposed regularly over the entire length of the light-emitting element like, for example, ABABAB—, AABAABAA—, BBBABBBABBBA—, or the like. And, the ratio of lengths of the light-emitting zones is not limited to 1:1, and may be changed freely to, for example, 2:1, 1:3, or the like according to the desired emitting effect, etc. In this specification, the term "light-emission intensity" is used for the purpose of expressing several characteristics about the light emission for delineation of the present invention, and includes the chromaticity, transparency, and other properties of outgoing light in addition to the generally recognized brightness (illuminance, light intensity, etc.) of outgoing light.

In one embodiment, the light-emitting elements are disposed so as to allow light to be emitted from the light-emitting zones in continuous sequence in the longitudinal direction in order to secure the directional movement of light. Additionally, the adjacent light-emitting elements are disposed with a predetermined distance deviation preferably in the direction from top to bottom, or in the direction from bottom to top in order to allow for light emission for delineation, in other words, sequential regular light emission with a time difference.

Two or more light-emitting zones making up the light-emitting element may be configured in various manners within the scope of the present invention. Preferably, the light-emitting zones comprises a main-emitting zone allowing a predetermined level of light-emission intensity, and a semi-emitting zone allowing a light-emission intensity lower than said predetermined light-emission intensity. In one embodiment, these zones alternate and repeat. If necessary, for example, one or more mid-emitting zones allowing an intermediate light-emission intensity may be provided in addition to the above two emitting zones.

As the main-emitting zone, part of the light-emitting element is used as it is in its bare condition. As the semi-emitting zone, it is preferable that any given light-emission intensity adjusting treatment is given to part of the light-emitting element in order to suppress the light-emission intensity to obtain the light-emission intensity different from that allowed by the main-emitting zone. Suitable light-emission intensity adjusting treatments include, but are not limited to, forming a light-emission intensity adjusting layer around the portions of the light-emitting element corresponding to the semi-emitting zones, such as forming a film or coating having a function of degrading the light-emission intensity of the outgoing light around the light-emitting element, forming a roughened surface layer around the light-emitting element, for example. In one embodiment, a semi-emitting zone by which light is attenuated may be formed by adhesively attaching (e.g., pasting) a semitransparent film to and around the light-emitting element. Similarly, a semi-emitting zone by which light is colored in a different color from that of the light from the main-emitting zone may be formed by pasting a color film. Such light-emission intensity adjusting treatment method will be described in detail in the description of using optical fibers as the light-emitting elements.

In one embodiment, part of the light-emitting element in bare condition is used for the main-emitting zone. In an alternate embodiment, part of the light-emitting element to which a treatment, such as a light-emission intensity adjusting treatment, has been applied may be used as the main-emitting zone.

The light-emitting element may be made of various materials. Typical light-emitting elements include, but are not limited to, an optical fiber comprising a core and a clad which is around the core and allows the light incident from an end of the core to be emitted, a tube-shaped light-emitting element comprising a flexible tube and a core (usually, liquid, solid, or gel) which is accommodated in the flexible tube and has a refractive index higher than that of the flexible tube, and a waveguide type light-emitting element.

As a side face emitting type optical fiber, various side face emitting optical fibers may be used which are described in U.S. Pat. No. 4,422,719, PCT International Publication (WO) No. 98/08024, Japanese Unexamined Patent Publication (Kokai) Nos. 6-118236 to 6-118240, No. 6-118243, No. 6-118244, No. 10-142428, and No. 10-148725, all of which are hereby incorporated by reference.

Such side face emitting type optical fibers comprise a core and a clad, and are given the following various treatments in order to allow a side face emission:

(1) provide a light-diffusion layer between a core and a clad, (2) provide a light-diffusion layer and a protection layer between a core and a clad, (3) distribute a light-diffusion layer in a clad totally or partially, (4) make the interface between a core and a clad irregular, (5) provide a roughened face or a uneven face on the surface of an optical fiber, (6) make an optical fiber have a distortion, (7) crystallize a clad totally or partially by a heat and humidity treatment, (8) make a core have a birefringence function totally or partially by a draw treatment, (9) form a clad from two or more kinds of polymer compositions totally or partially, and the like.

In addition, the side face emitting type optical fiber described in Japanese Unexamined Patent Publication (Kokai) No. 2000-131530, hereby incorporated by reference, may also be used advantageously. This optical fiber comprises a center core and a clad having a light-diffusion layer made of light-diffusion materials including polymers, as a binder resin, having a refractive index smaller than that of the core. The core has preferably a refractive index of 1.4 to 2.0, and comprises, for example, quartz glass, optical glass, or polymers. A preferred material for the core is, for example, an optically transparent polymer such as acrylic polymer, poly-methyl pentene, ethylene-vinyl acetate copolymer, polyvinyl chloride, or vinyl acetate—vinyl chloride copolymer, which has usually a refractive index of 1.4 to 1.7. These core materials may be given a heat resisting treatment.

The core usually has a circular cross section, but may have an elliptical cross section, semicircular cross section, or any other cross sectional shape. The diameter of the core is usually 3 to 40 mm and preferably 5 to 30 mm in the case of a circular cross section. In some cases, a core having a diameter smaller or larger than these diameters may be used.

In one embodiment, the clad adhered to the perimeter of the core has a light-diffusion layer comprising a binder resin made of low refractive index polymer. The binder resin may contain a light-diffusion material dispersed in the binder resin. The binder material is preferably a translucent fluorine polymer having a refractive index of approximately 1.34 to 1.43 such as FEP, ETFE, or THV. The light-diffusion material is preferably a light-scattering element having a particle size of approximately 10 nm to 300 Fm such as glass beads, titanium dioxide particles, white inorganic powder (e.g., barium sulfate, magnesia, titania, etc.), or coloring pigment. These light-diffusion materials are used usually in a quantity of 0.01 to 10 weight percent.

A finished side face emitting type optical fiber may have various lengths according to uses and other factors concerning the lighting apparatus. The length of the optical fiber is usually approximately 1 to 120 m.

In such side face emitting type optical fibers, the semi-emitting zone may be formed by various methods. One suitable method of forming the semi-emitting zone is a method by which a light-attenuating means such as a film or a coating having a function of degrading the light-emission intensity of the outgoing light is provided around the optical fiber. The suitable materials for such light-attenuating means include, but are not limited to, resinous materials such as polyvinyl chloride, polyethylene, polypropylene, acrylic resin, polycarbonate, polyamide, polystyrene, silicon resin, fluorocarbon resin, and polyethylene terephthalate (PET). As an example, one light-attenuating means in the form of a film is an attenuating film with pressure sensitive adhesive using a polyester base material such as 3M Scotchtint™ film, Neutral 50 (Production No. RE50NEARL). In another example, if the light-attenuating means is a color film, the color film may include a yellow film and/or a green film. For example, one suitable film is a color film with pressure sensitive adhesive using polyvinyl chloride base material such as 3M Scotchcal™ film, Lemon Yellow (Production No. TP-3103). Another suitable film is a color film with pressure sensitive adhesive using polyvinyl chloride base material such as 3M Scotchcal™ film, Emerald Green (Production No. TP-3702). Furthermore, instead of such resinous material, glass or the like may be used to form the semi-emitting zone.

When forming the semi-emitting zone where the light-attenuating means is a film, various methods may be used to secure the film to the optical fiber. For example, the film may be pasted to the optical fiber using an adhesive, the film may be attached to the optical fiber with a suitable jig, or the film may be formed into a tube which is then attached or pasted to the optical fiber. Where the light-attenuating means is a coating film, for example, the semi-emitting zone may be formed by dissolving the resinous material in solvent or melting the resinous material by heating and then pasting the dissolved or melted resin on the optical fiber in a predetermined thickness and hardening it by using a extrusion machine. In another example, the semi-emitting zone may be formed by putting a light-attenuating material such as a cover with a ᵯ-shaped cross section on predetermined portions of the optical fiber instead of by providing a film or coating film.

Another suitable method of forming the semi-emitting zone is a method by which a roughened face is formed on the periphery of the optical fiber to provide an integral light-emission intensity adjusting layer instead of providing a separate light-attenuating means. The roughened face is formed advantageously, for example, by laser-machining selectively the periphery of the clad of the optical fiber. The obtained uneven face functions as an light-emission intensity adjusting layer, and at the same time enhances the decoration effect. Along with forming the roughened face of the semi-emitting zone, a similar roughened face may be formed on the main-emitting zone, preferably so that a light-emission intensity higher than the light-emission intensity of the semi-emitting zone is achieved.

In addition to the methods discussed above, any known forming methods for obtaining a side face emission may be used.

In one embodiment, the light-emitting element used for the lighting apparatus of the present invention is a side face emitting type optical fiber as described above, and this optical fiber may have a rectangular cross section instead of a circular cross section, elliptical cross section or semicircular cross section, for example. In this case, the light-emission effect varies by using a modified optical fiber having a rectangular cross section.

Furthermore, as a side face emitting type optical fiber, a side light fiber, as described above, emitting evenly throughout the entire length thereof is usually used advantageously, and a high-tenacity side light fiber or a high intensity side light fiber emitting in a line form in one direction along it may also be used because a special emitting effect such as line illumination is expected. As a matter of course, these different kinds of fibers may be used in combination.

As a tube-shaped light-emitting element, for example, the tube-shaped light-emitting element, as described in Japanese Unexamined Patent Publication (Kokai) No. 8-246427, hereby incorporated by reference, comprising a flexible tube and a core which is accommodated in the flexible tube and has a refractive index higher than that of the flexible tube may be used. In such light-emitting element, the tube having a outer diameter of 5 to 20 mm may be formed by using, for example, resinous material such as polyethylene, polypropylene, polyvinyl chloride, or polyamide, or rubber such as butyl rubber, fluorocarbon rubber, or silicon rubber. Furthermore, as the core accommodated in the tube, various kinds of viscous liquid, solid or gel, for example, polyethylene oxide, polyol group such as glycerin, polyol ester group, polyol ether group, phosphate ester group, liquid paraffin, silicon oil, solid-state polymetyl methacrylate, etc. may be used.

Furthermore, special purpose light-emitting elements include a flush type light-emitting element such as a waveguide. This kind of light-emitting element has an advantage that it may be used being buried, for example, in a slope beside a road or a sidewall of a building.

In the delineator lighting apparatus of the present invention, it is preferable that an optical conversion device for converting the light from the light source to an incident light suitable for the light-emitting element is further provided between the end face of the light-emitting element and the light source. A suitable incident light includes a light which is blocked, attenuated, or colored, for example, at any given time.

The optical conversion device serving such function is preferably a filter element. The filter element may comprise a single kind of filter but is preferably a composite filter capable of converting the light from the light source to at least two kinds of incident lights such as original light, transparent light, semitransparent light, attenuated light, colored light, and blocked light by using filter elements selected from the group consisting of open, transparent, semitransparent, attenuated, colored, and light-blocking. The composite filter may formed by, for example, dividing a single circular filter into two, three, or four equal parts or the like. The composite filter may be formed conveniently by adhesively attaching (e.g., pasting) a semitransparent film, light-attenuating film, color film or light-blocking film, for example, in a desired combination to a filter made of a material such as plastic or glass. These films are preferably heat-resistant. Examples of light-attenuating films and examples of color films were the described above. One suitable light-blocking film is a color film with pressure sensitive adhesive using polyvinyl chloride base material, for example, 3M Scotchcal™ film, Black (Production No. JS-1500).

In another method, a desired composite filter may be formed by adhering suitable light-attenuating materials, coloring materials, and/or light-blocking materials, for example, to predetermined portions of a filter by a film forming method such as coating or evaporation.

In one embodiment of the delineator lighting apparatus, at least one of the plurality of light-emitting elements constituting the lighting apparatus emits light while the lighting apparatus is used. That is, when the delineator lighting apparatus is installed at curves in roads or other locations, it may always inform automobile drivers or other observers of the existence of dangerous zones because it is ensured that at least one of the light-emitting elements always emits.

The delineator lighting apparatus of the present invention may be used as a delineator sign or in other traffic sign systems when it is installed at curves in roads, dangerous zones such as cliffs or wharfs, or atop a pole, for example.

The delineator lighting apparatus of the present invention may also be used as a decorative system when it is installed in show windows of stores or installed on the roofs of buildings alone or in combination with a neon sign, for example.

The present invention will be further described with reference to the following examples. Note, however, that the present invention is not restricted by these examples.

EXAMPLE 1

Figure 3:
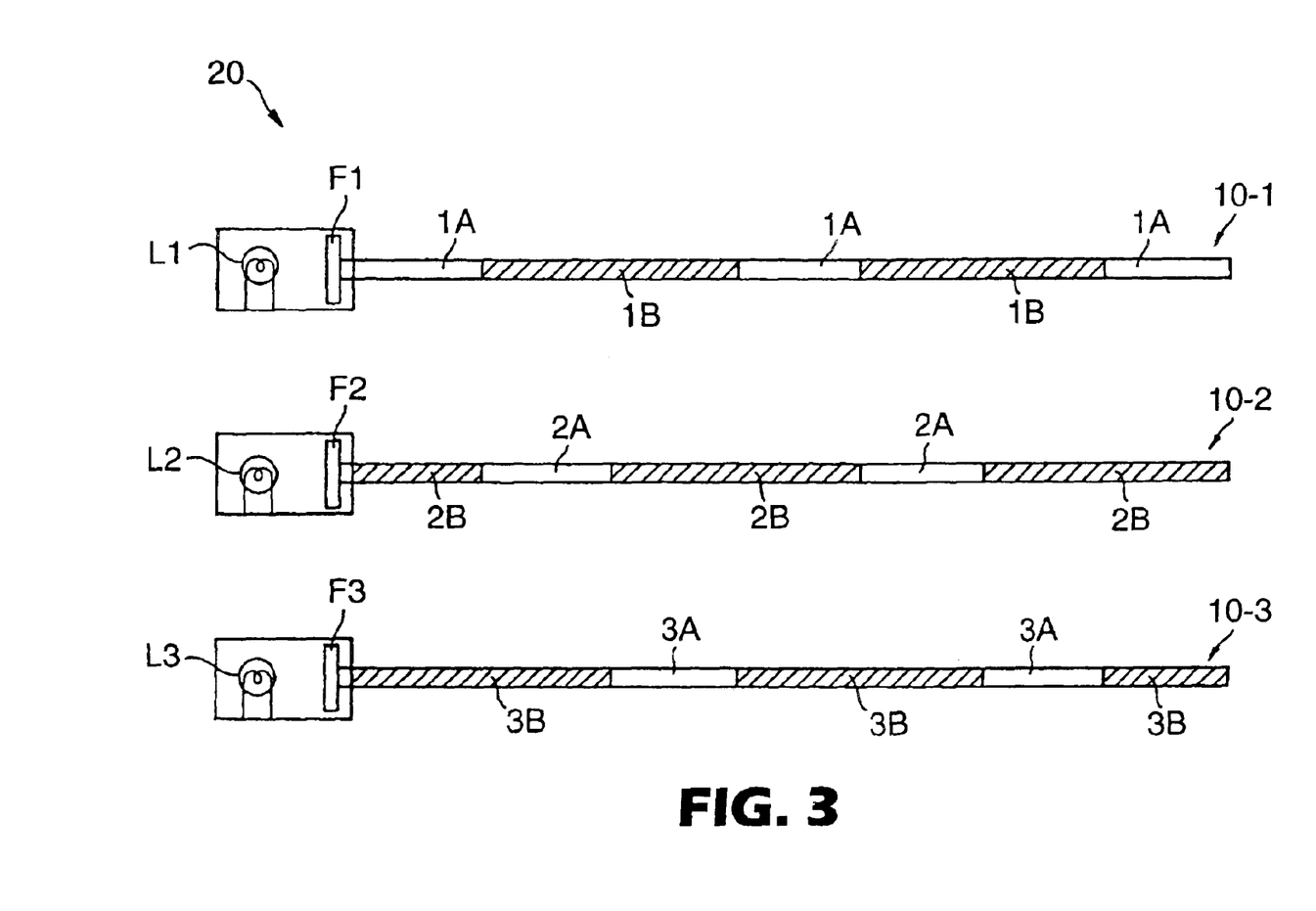
FIG. 3 is a front view of one example of the delineator lighting apparatus according to the present invention
Figure 4:
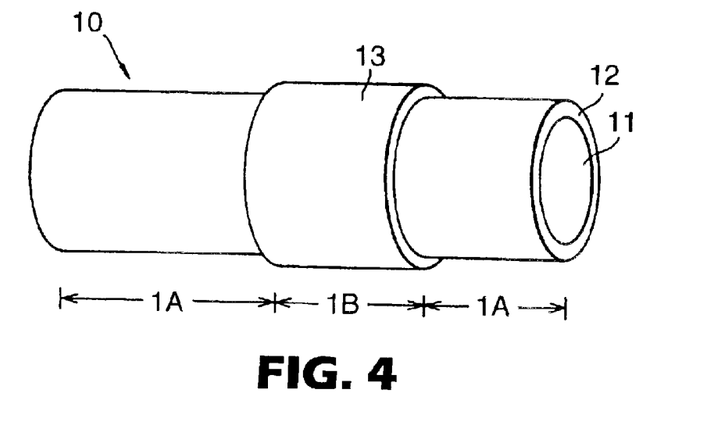
FIG. 4 is a perspective view of one embodiment of a side face emitting type optical fiber used for the delineator lighting apparatus shown in FIG. 3.
Figure 5:
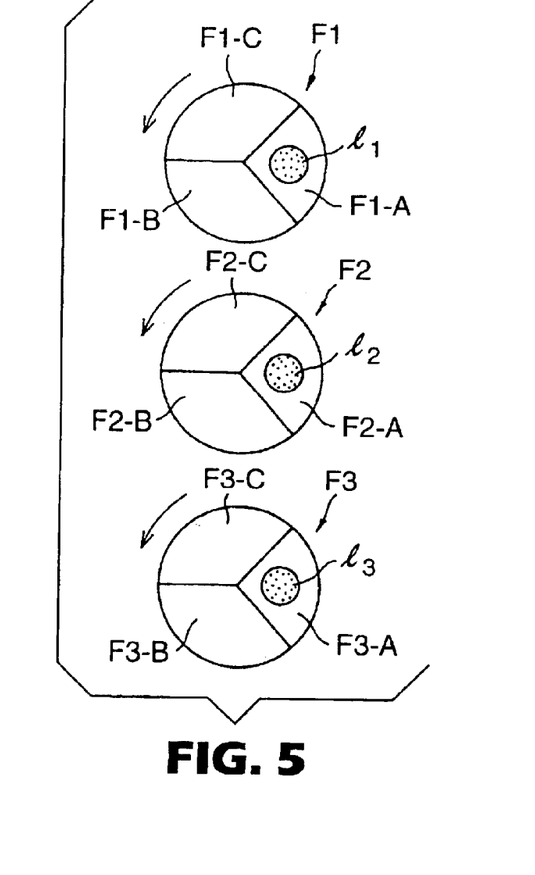
FIG. 5 is a schematic diagram depicting the functions of the filters used for the delineator lighting apparatus shown in FIG. 3.

The delineator lighting apparatus 20 of this example is made as shown in FIGS. 3 to 5. As shown in FIG. 3, side face emitting type optical fibers 10-1, 10-2, and 10-3 are connected to the light sources L1, L2, and L3 respectively. The semi-emitting zones 1B, 2B, and 3B are so formed that films 13 are white films having a predetermined length are pasted on each of the optical fibers so as to cover its outer periphery. For example, the semi-emitting zones 1B are formed, as understood from FIG. 4 showing part of the optical fiber 10-1, so that white films 13 are pasted on predetermined portions of the optical fiber 10-1 comprising a core 11 and a clad 12. The portions not covered with the white film 13 are the "main-emitting zones 1A." As described above, the main-emitting zones 1A, 2A, and 3A emit high intensity light, and the semi-emitting zones 1B, 2B, and 3B emit lower intensity light; main-emitting zones 1A, 2A and 3A and semi-emitting zones 1B, 2B and 3B are formed alternately on the optical fibers 10-1, 10-2, and 10-3 respectively. Furthermore, the main-emitting zones 1A, 2A, and 3A are disposed as deviated sequentially in one direction. Positioned between the respective light sources L1, L2 and L3 and the optical fibers 10-1, 10-2 and 10-3 are trichotomous revolving filters F1, F2, and F3, constructions of which are schematically shown in FIG. 5, are disposed respectively. The lights $l_1$, $l_2$, and $l_3$ incident to the optical fiber 10-1, 10-2, and 10-3 respectively are blocked, attenuated, or colored (attenuated in this embodiment), according to the compositions of the rotating filters F1, F2, and F3, by turning the revolving filters F1, F2, and F3 in the arrow direction (see FIG. 5) at the same speed.

The composition of the rotating filters F1, F2, and F3 used in this example is as shown in Table 1. That is, the light $l_1$ from the light source L1 to the optical fiber 10-1 varies in the order of "direct light—attenuated light—attenuated light" every time the revolving filter F1 revolves 120 degrees. The light $l_2$ incident from the light source L2 to the optical fiber 10-2 varies in the border of "attenuated light—direct light—attenuated light." And the light $l_3$ incident from the light source L3 to the optical fiber 10-3 varies in the order of "attenuated light—attenuated light—direct light." Since the light incident to the optical fibers vary like this, the main-emitting zones 1A of the optical fiber 10-1 become brightest (emits the brightest light) at first, and the semi-emitting zones 1B become darker than the main-emitting zones 1A because the light is attenuated by the white film. At that time, the main emitting zones 2A and 3A, and the semi-emitting zones 2B and 3B of optical fibers 10-2 and 10-3 become darker than the main-emitting zones 1A of the optical fiber 10-1 because the incident light is attenuated by the light-attenuating filters. At all times, each of the fibers emits light throughout its entire length and is therefore visible throughout the entire length.

Next, when each of the rotating filters revolves 120 degrees, the main-emitting zones 2A of the optical fiber 10-2 emit the brightest light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers also slightly emits light from the portions other than the brightest portion, thereby being visible throughout the entire length.

EXAMPLE 2

The procedure for Example 1 is repeated except that the semi-emitting zones 1B, 2B, and 3B are so formed that films 13 are green films having a predetermined length are pasted on each of the optical fibers 10-1, 10-2, and 10-3 respectively so as to cover its outer periphery. Consequently, the main-emitting zones 1A of the optical fiber 10-1 emit the white brightest light, and the semi-emitting zones 1B of the optical fiber 10-1 emit green light because the semi-emitting zones 1B are colored with the green films. At that time, the main emitting zones 2A and 3A of optical fibers 10-2 and 10-3 emit attenuated white light, and the semi-emitting zones 2B and 3B of optical fibers 10-2 and 10-3 emit attenuated green light. At all times, each of the fibers emits light throughout its entire length and is therefore visible throughout the entire length.

Next, when each of the rotating filters revolves 120 degrees, the main-emitting zones 2A of the optical fiber 10-2 emit the brightest white light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers also slightly emits white or green light from the portions other than the brightest portion, thereby being visible throughout the entire length.

EXAMPLE 3

The procedure for the Example 2 is repeated except that the filters F1-B, F1-C, F2-A, F2-C, F3-A, and F3-B are changed from a light attenuation filter to a green filter as described in Table 1. Consequently, the main-emitting zones 1A of the optical fiber 10-1 emit the white brightest light, and the semi-emitting zones 1B of the optical fiber 10-1 emit green light because the semi-emitting zones 1B are colored with the green films. At that time, the main emitting zones 2A and 3A, and the semi-emitting zones 2B and 3B of optical fibers 10-2 and 10-3 emit green light. At all times, each of the fibers emits light throughout its entire length and is therefore visible throughout the entire length.

Next, when each of the rotating filters revolves 120 degrees, the main-emitting zones 2A of the optical fiber 10-2 emit the brightest white light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers also slightly emits green light from the portions other than the brightest portion, thereby being visible throughout the entire length.

EXAMPLE 4

The procedure for Example 3 is repeated except that the filters F1-B, F1-C, F2-A, F2-C, F3-A, and F3-B are changed from a green filter to a yellow filter as described in Table 1.

Consequently, the main-emitting zones 1A of the optical fiber 10-1 emit the brightest light, and the semi-emitting zones 1B of the optical fiber 10-1 emit yellow light because the semi-emitting zones 1B are colored with films 13 that are yellow. At that time, the main emitting zones 2A and 3A, and the semi-emitting zones 2B and 3B of optical fibers 10-2 and 10-3 emit yellow light. At all times, each of the fibers emits light throughout its entire length and is therefore visible throughout the entire length.

Next, when each of the rotating filters revolves 120 degrees, the main-emitting zones 2A of the optical fiber 10-2 emit the brightest light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers also slightly emits yellow light from the portions other than the brightest portion, thereby being visible throughout the entire length.

EXAMPLE 5

The procedure for Example 1 is repeated except that the filters F1-B, F1-C, F2-A, F2-C, F3-A, and F3-B are changed from a light attenuation filter to a light-blocking filter as described in Table 1. Consequently, the main-emitting zones 1A of the optical fiber 10-1 emit the brightest light, and the semi-emitting zones 11B of the optical fiber 10-1 emit less light than the main-emitting zones 1A because the semi-emitting zones 1B are colored with the white films 13. At that time, the optical fibers 10-2 and 10-3 do not emit light because the optical path is interrupted with the light-blocking filter and are therefore not visible. The optical fiber 10-1 is visible throughout the entire length.

Next, when each of the rotating filters revolves 120 degrees, the main-emitting zones 2A of the optical fiber 10-2 emit the brightest white light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers repeats its lighting and light-blocking phases sequentially at the brightest portions and the white color portions which are darker than the brightest portions, and thereby any one of the optical fibers is visible throughout the entire length.

EXAMPLE 6

The procedure for Example 5 is repeated except that the semi-emitting zones 1B, 2B, and 3B are so formed that films 13 are green films having a predetermined length are pasted on each of the optical fibers 10-1, 10-2, and 10-3 respectively so as to cover its outer periphery. Consequently, the main-emitting zones 1A of the optical fiber 10-1 emit the brightest light, and the semi-emitting zones 1B of the optical fiber 10-1 emit green light because the semi-emitting zones 1B are colored with the green films. At that time, the optical fibers 10-2 and 10-3 do not emit light because the optical path is interrupted with the light-blocking filter and are therefore not visible. The optical fiber 10-1 is visible throughout the entire length.

Next, when each of the rotating filters revolves 120 degrees, the main-emitting zones 2A of the optical fiber 10-2 emit the brightest light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers repeats its lighting and light-blocking phases sequentially at the brightest portions and the green color portions, and thereby any one of the optical fibers is visible throughout the entire length.

EXAMPLE 7

The procedure for Example 5 is repeated except that the semi-emitting zones 1B, 2B, and 3B are so formed that films 13 are yellow films having a predetermined length are pasted on each of the optical fibers 10-1, 10-2, and 10-3 respectively so as to cover its outer periphery. Consequently, the main-emitting zones 1A of the optical fiber 10-1 emit the brightest light, and the semi-emitting zones 1B of the optical fiber 10-1 emit yellow light because the semi-emitting zones 1B are colored with the yellow films. At that time, the optical fibers 10-2 and 10-3 do not emit light because the optical path is interrupted with the light-blocking filter and are therefore not visible. The optical fiber 10-1 is visible throughout the entire length.

Next, when each of the rotating filters revolves 120 degrees, the main-emitting zones 2A of the optical fiber 10-2 emit the brightest light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as in the initial state. As the result of such variation of light emission, the brightest portion seems to move sequentially away from the light source. In addition, each of the optical fibers repeats its lighting and light-blocking phases sequentially at the brightest portions and the green color portions, and thereby any one of the optical fibers is visible throughout the entire length.

COMPARATIVE EXAMPLE 1

The procedure for Example 5 is repeated except that the semi-emitting zones 1B, 2B, and 3B are so formed, for comparison, that light-blocking films having a predetermined length are pasted on each of the optical fibers 10-1, 10-2, and 10-3 respectively so as to cover its outer periphery. Consequently, the main-emitting zones 1A of the optical fiber 10-1 emit the brightest light, and the semi-emitting zones 1B of the optical fiber 10-1 do not emit light because the optical path is interrupted with the light-blocking film. At that time, the other optical fibers 10-2 and 10-3 also do not emit light because the optical path is interrupted with the light-blocking filter.

Next, when each of the rotating filters revolves 120 degrees, the main-emitting zones 2A of the optical fiber 10-2 emit the brightest white light, and when revolving another 120 degrees, the main-emitting zones 3A of the optical fiber 10-3 emit the brightest light, and when revolving another 120 degrees, the main-emitting zones 1A of the optical fiber 10-1 emit the brightest light as the initial state. As the result of such variation of light emission, the brightest portion seems to move sequentially away from the light source. However, each of the optical fibers repeats lighting and light-blocking sequentially only at the brightest portions, and are thereby not visible throughout the entire length.

COMPARATIVE EXAMPLE 2

The procedure for Example 5 is repeated except that the process of forming the semi-emitting zones 1B, 2B, and 3B by covering the outer peripheries of the optical fibers 10-1, 10-2, and 10-3 is omitted for comparison. Consequently, the optical fiber 10-1 emits white light throughout the entire length.

Next, when each of the rotating filters revolves 120 degrees, the optical fiber 10-2 emits white light throughout the entire length, and when revolving another 120 degrees, the optical fiber 10-3 emits white light throughout the entire length, and when revolving another 120 degrees, the optical fiber 10-1 emits white light throughout the entire length as in the initial state. As the result of such variation of light emission, any one of the optical fibers is visible identified throughout the entire length, but each of the optical fibers only repeats lighting and light-blocking sequentially throughout the entire length, and thereby directional movement of light is not observed.

TABLE I

| Ex. No. | Semi-emitting zone | Kind of Filter | | | | | | | | |
|---|---|---|---|---|---|---|---|---|---|---|
| | | Filter F1-A | Filter F1-B | Filter F1-C | Filter F2-A | Filter F2-B | Filter F2-C | Filter F3-A | Filter F3-B | Filter F3-C |
| Ex. 1 | White Film | Transparent | Light Attenuating | Light Attenuating | Light Attenuating | Transparent | Light Attenuating | Light Attenuating | Light Attenuating | Transparent |
| Ex. 2 | Green Film | Transparent | Light Attenuating | Light Attenuating | Light Attenuating | Transparent | Light Attenuating | Light Attenuating | Light Attenuating | Transparent |
| Ex. 3 | Green Film | Transparent | Green | Green | Green | Transparent | Green | Green | Green | Transparent |
| Ex. 4 | Yellow Film | Transparent | Yellow | Yellow | Yellow | Transparent | Yellow | Yellow | Yellow | Transparent |
| Ex. 5 | White Film | Transparent | Light Blocking | Light Blocking | Light Blocking | Transparent | Light Blocking | Light Blocking | Light Blocking | Transparent |

TABLE I-continued

| Ex. No. | Semi-emitting zone | Filter F1-A | Filter F1-B | Filter F1-C | Filter F2-A | Filter F2-B | Filter F2-C | Filter F3-A | Filter F3-B | Filter F3-C |
|---|---|---|---|---|---|---|---|---|---|---|
| Ex. 6 | Green Film | Transparent | Light Blocking | Light Blocking | Light Blocking | Transparent | Light Blocking | Light Blocking | Light Blocking | Transparent |
| Ex. 7 | Yellow Film | Transparent | Light Blocking | Light Blocking | Light Blocking | Transparent | Light Blocking | Light Blocking | Light Blocking | Transparent |
| Com Ex. 1 | Light Blocking Film | Transparent | Light Blocking | Light Blocking | Light Blocking | Transparent | Light Blocking | Light Blocking | Light Blocking | Transparent |
| Com Ex. 2 | No Film | Transparent | Light Blocking | Light Blocking | Light Blocking | Transparent | Light Blocking | Light Blocking | Light Blocking | Transparent |

As understood from the results of Examples 1 to 7 and Comparative Examples 1 and 2, the delineator lighting apparatus according to the present invention may be designed to always provide directional movement of the light without a break over a long distance.

As described above, the delineator lighting apparatus according to the present invention may provide for directional movement of the light without a break over a long distance. Thus, this delineator lighting apparatus may used advantageously, utilizing this directional movement of light, as a traffic sign system for guiding a person's line of sight at curves in roads, passages in buildings, or the like, or calling attention to station platforms and pedestrian crossings, for example. In particular, since the delineator lighting apparatus may emit light in a line form without a break, it is suitable for guiding a person's line of sight at curves in roads, passages, or the like having a complicated form.

Furthermore, the lighting apparatus according to the present invention may be used advantageously, utilizing the characteristic delineation effect, in fields other than traffic systems. For example, it may be used in decorative systems such as displays of stores, alternatives for neon signs on the roofs of buildings, or the like.

Although the present invention has been described with reference to preferred embodiments, workers skilled in the art will recognize that changes may be made in form and detail without departing from the spirit and scope of the invention.

What is claimed is:

1. A delineator lighting apparatus comprising:
   a light source for producing light; and
   a plurality of longitudinally-extending light-emitting elements, each light-emitting element having a length and comprising:
      a plurality of first light-emitting zones disposed along the length, each first light-emitting zone emitting light with a first light-emission intensity; and
      a plurality of second light-emitting zones disposed along the length and interspersed within the plurality of first light-emitting zones, each second light-emitting zone emitting light with a second light-emission intensity different from the first light-emission intensity;
      in which the plurality of first light-emitting zones and the plurality of second light-emitting zones are arranged in a regular pattern along the length of each light-emitting element, wherein the pattern of the first and second light-emitting zones of one the elements is offset from the pattern of first and second light-emitting zones of another one of the elements by a distance along the length of each element;
      wherein at any time during operation, at least one light-emitting element emits light along substantially its entire length.

2. The delineator lighting apparatus of claim 1 in which each of the plurality of light-emitting elements has the same composition.

3. The delineator lighting apparatus of claim 1 in which one of the plurality of light-emitting elements has a different composition than another one of the plurality of light-emitting elements.

4. The delineator lighting apparatus of claim 1 wherein the distance is approximately a length of one of the first light-emitting zones.

5. The delineator lighting apparatus of claim 1 in which the light-emitting elements are disposed substantially parallel to each other, one light-emitting element being separated from an adjacent light-emitting element by a distance.

6. The delineator lighting apparatus of claim 1 further comprising a light-emission intensity adjusting layer at each of the plurality of second light-emitting zones.

7. The delineator lighting apparatus of claim 1 further comprising a plurality of light sources, wherein the plurality of light sources are disposed at a common end of the plurality of light-emitting elements.

8. The delineator lighting apparatus of claim 1 further comprising an optical conversion device for converting the light from the light source to incident light, wherein the optical conversion device is disposed intermediate the light source and a light-emitting element.

9. The delineator lighting apparatus of claim 8 in which the optical conversion device is a rotating filter.

10. The delineator lighting apparatus of claim 8 in which the optical conversion device comprises a composite filter having at least two kinds of filter elements selected from the group consisting of open, transparent, semitransparent, attenuated, colored, and light-blocking.

11. The delineator lighting apparatus of claim 1, wherein each of the light-emitting elements is a side face emitting type optical fiber, each fiber comprising a core and a clad which is disposed around the core and allows a light incident from an end of said core to be emitted.

12. A method of illuminating a delineator lighting apparatus comprising:
   providing a delineator lighting apparatus comprising:
      a light source for producing light; and
      a plurality of longitudinally-extending light-emitting elements, each light-emitting element having a length and comprising:
         a plurality of first light-emitting zones disposed along the length, each first light-emitting zone emitting light with a first light-emission intensity; and a plurality of second light-emitting zones disposed along the length and interspersed within the plurality of first light-emitting zones, each second light-emitting zone emitting light with a second light-emission intensity different from the first light-emission intensity;

illuminating each of the plurality of light-emitting elements in sequence, wherein an illumination of a first element is followed by an illumination of an adjacent element; and repeating the illumination in sequence in a continuous manner;

so that an unbroken line of light with a moving section of light is emitted from the plurality of light-emitting elements, the moving section of light corresponding to light transmitted through the plurality of first light-emitting zones.

13. The method of claim 12 further comprising:

positioning a rotating filter between the light source and each light-emitting element; and rotating each filter at a same speed.

* * * * *

UNITED STATES PATENT AND TRADEMARK OFFICE
CERTIFICATE OF CORRECTION

PATENT NO. : 6,830,366 B2
DATED : December 14, 2004
INVENTOR(S) : Irie, Shinichi It is certified that error appears in the above-identified patent and that said Letters Patent is hereby corrected as shown below:

Column 7,
Line 24, delete "polymetyl" and insert -- polymethyl --.

Column 8,
Line 57, delete "border" and insert -- order --.

Column 10,
Line 43, after "zones" delete "11B" and insert -- 1B --.

Column 13,
Lines 65-66, delete "the" before "first".
Line 66, after "one" insert -- of --.

Signed and Sealed this

Twenty-fourth Day of May, 2005

JON W. DUDAS
*Director of the United States Patent and Trademark Office*